United States Patent
Arhart et al.

(10) Patent No.: US 6,716,920 B2
(45) Date of Patent: Apr. 6, 2004

(54) MOISTURE CURABLE, MELT PROCESSIBLE GRAFT ETHYLENE COPOLYMERS

(75) Inventors: Richard James Arhart, Wilmington, DE (US); George Wyatt Prejean, Orange, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/232,981

(22) Filed: Aug. 30, 2002

(65) Prior Publication Data

US 2003/0032728 A1 Feb. 13, 2003

Related U.S. Application Data

(63) Continuation-in-part of application No. 09/435,792, filed on Nov. 8, 1999, now abandoned.

(51) Int. Cl.[7] ............................................. C08G 77/26
(52) U.S. Cl. ..................................................... 525/102
(58) Field of Search .......................................... 525/102

(56) References Cited

U.S. PATENT DOCUMENTS

| | | |
|---|---|---|
| 3,408,420 A | * 10/1968 | Wiggill ........................ 525/102 |
| 3,780,140 A | 12/1973 | Hammer |
| 4,351,931 A | 9/1982 | Armitage |
| 4,614,766 A | 9/1986 | Schimmel et al. |
| 4,851,481 A | 7/1989 | Kuriyama et al. |
| 5,210,150 A | 5/1993 | Prejean |
| 5,389,728 A | 2/1995 | Prejean |
| 5,484,847 A | 1/1996 | Prejean |
| 5,977,255 A | * 11/1999 | Li et al. ...................... 525/102 |

FOREIGN PATENT DOCUMENTS

| | | |
|---|---|---|
| EP | 0171986 A1 | 2/1986 |
| EP | 0387591 A2 | 9/1990 |
| EP | 0666290 A1 | 8/1995 |
| WO | WO 99/18137 | 4/1999 |

* cited by examiner

*Primary Examiner*—Margaret G. Moore

(57) ABSTRACT

The present invention relates to high performance wire and cable compositions and to hot melt adhesives containing a silyl-grafted ethylene copolymer having particularly low levels of glycidyl acrylate monomer. The preferred epoxy glycidyl methacrylate copolymerized into the polymer backbone provides a graft site for the aminosilane. Subsequent moisture crosslinking at the silyl site of the thermally stable graft copolymer provides compositions with attractive physical properties for wire and cable semicons, insulation, and jackets, as well as hot melt adhesives. The preferred aminosilane is N-cyclohexylaminopropyl trimethoxysilane.

5 Claims, No Drawings

MOISTURE CURABLE, MELT PROCESSIBLE GRAFT ETHYLENE COPOLYMERS

CROSS-REFERENCE TO RELATED APPLICATIONS

This application is a continuation-in-part of U.S. patent application Ser. No. 09/435,792 filed Nov. 8, 1999, herein incorporated by reference now abandoned.

BACKGROUND OF THE INVENTION

1. Field of the Invention

The present invention relates to high performance wire and cable resins and to hot melt adhesives containing a silyl grafted ethylene copolymer having particularly low levels of a glycidyl acrylate comonomer.

2. Description of the Related Art

U.S. Pat. Nos. 5,389,728 and 5,484,847 describe the preparation and use of moisture curable, melt processible, graft copolymers which are obtained by reacting certain ethylene copolymers having copolymerized therewith a glycidyl containing comonomer(s) which is then further reacted with a particular grafting agent selected from N-tert-butylaminopropyl trimethoxysilane. This particular class of grafted copolymers was described as sufficiently stable for co-extrudable hot melt adhesive use. Wire and cable applications were also mentioned for this particular class. The above patent disclosures also clearly described certain substituted aminopropyl trimethoxysilanes grafted ethylene copolymers (ethylene/alkyl acrylate/glycidyl methacrylate as the direct copolymer) which were particularly unsuitable for hot melt adhesive use because of their thermal instability under hot melt adhesive use conditions. Included among the list of particularly unsuitable silanes to be utilized as a grafting reagent was N-cyclohexylaminopropyl trimethoxysilane as well as numerous others. Comparative example 2 in U.S. Pat. No. 5,389,728 clearly shows the unsuitability of a copolymer having ethylene, an alkyl acrylate and a glycidyl termonomer grafted with N-cyclohexylaminopropyl trimethoxysilane. The only suitable N-alkylaminopropyl trimethoxysilane for hot melt adhesive use was the patented t-butyl derivative. Other comparative unsuitable examples were also described.

On the other hand, and with respect to vinyl acetate containing copolymers, U.S. Pat. No. 5,484,847 did not disclose any specific comparative examples showing other N-substituted aminopropyl trimethoxysilanes and only specifically disclosed an ethylene/vinyl acetate/glycidyl methacrylate copolymer containing 11.1 wt. % EVA and 7.4 wt. % glycidyl methacrylate with N-tert-butylaminopropyl trimethoxysilane grafted thereto. This patent disclosure did not teach anything about the use or potential use of other N-substituted aminopropyl trimethoxysilanes as grafting reagents with vinyl acetate containing ethylene copolymers. All comparative examples and/or teachings with respect to any reagent other than N-tert-butylaminopropyl trimethoxysilanes were directed to the alkyl acrylate containing copolymers.

Both patent disclosures discussed above expressly or implicitly teach away from the use or potential use of ethylene copolymers having an alkyl acrylate or a vinyl acetate as a comonomer along with a glycidyl containing comonomer which is subsequently grafted with an aminosilane other than the specific t-butylaminopropyl trimethoxysilane.

Furthermore, the above patent disclosures suggest that at lower percentages of glycidyl moiety in the disclosed compositions (equal to or less than 6 percent) grafting catalysts are required to speed up the grafting reaction.

In view of the above, there is a need to develop additional copolymers which provide good performance in hot melt adhesives as well as wire and cable applications which continue to demand reliable physical properties at extreme temperatures or wide temperature variations and which can be readily made in an extruder. In addition, prior art thermoset resins generally require continuous vulcanization (CV) tubes and/or radiation equipment to provide high performance thermoset properties and known vinyl silane moisture curable systems typically require peroxide, catalyst and high graft temperatures which can lead to undesired side crosslinking reactions and an increase in compound viscosity.

BRIEF SUMMARY OF THE INVENTION

The present inventors have discovered a thermally stable grafted terpolymer having a glycidyl moiety which contains an N-cyclohexyl-aminopropyl trimethoxysilane or other N-alkyl- or N-arylalkylaminopropyl trimethoxysilanes which were formerly thought to be unsuitable and which do not require a CV tube, peroxide, extruder catalyst addition or high graft temperatures. It has been discovered that because of a specific low range of glycidyl monomer in the present invention, thermal stability is achieved for hot melt adhesive compositions having the claimed grafted copolymers therein. It has also been surprisingly found that catalysts are unnecessary to effect the grafting reaction at these lower percentages of glycidyl monomer and that moisture-curing catalysts are also unnecessary.

The present inventors have also found that the relative composition of the direct copolymer, wherein one of the monomers is vinyl acetate, affects the suitability of a grafted copolymer based thereon for wire and cable applications. It has also been found that an ethylene vinyl acetate copolymer having a narrow, specific range of glycidyl comonomer which is subsequently grafted in an extruder with an N-substituted aminopropyl trimethoxysilane (excluding N-t-butyl) and subsequently formed into a coating for a wire or cable (or material suitable for forming a coating for a wire and cable) provides a particularly effective wire and cable coating with good moisture curing thermoset properties, thus, further providing effective wire and cable products.

Thus the present invention provides a thermally-stable, grafted copolymer E/X/Y-(G) composition comprising monomers E, X, and Y in random order and grafting reagent G, wherein:

E is ethylene;

X comprises from 8 to 70 weight percent relative to the total weight of E/X/Y and is selected from the group consisting of a $C_1$ to $C_8$ alkyl acrylate, a $C_1$ to $C_8$ alkyl methacrylate, and vinyl acetate;

Y comprises about 1 to 4 weight percent relative to the total weight of E/X/Y of a glycidyl containing monomer selected from the group consisting of glycidyl acrylate, glycidyl methacrylate and glycidyl vinyl ether; and G comprises from 15 to 150 percent of a stoichiometric amount with respect to the weight of the glycidyl moiety, of a secondary aminosilane compound of the formula

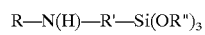

wherein R' is a $C_1$ to $C_6$ alkylene group, R" is a $C_1$ to $C_6$ alkyl group, and R is selected from
- a) a secondary radical of the formula —$CHR^1R^2$ wherein $R^1$ and $R^2$ are independently selected from $C_1$ to $C_6$ alkyl or $C_1$–$C_6$ arylalkyl and wherein $R^1$ and $R^2$ may be joined to form a $C_5$ to $C_9$ cycloaliphatic ring; or
- b) a primary radical of the formula —$CH_2R^3$ wherein $R^3$ is selected from (i) a $C_3$ to $C_{12}$ alkyl group, wherein, in the case of a $C_3$ to $C_6$ alkyl group, said alkyl moiety is branched, or (ii) a ($C_1$ to $C_{12}$ alkyl)-aryl group, wherein $R^1$, $R^2$, and $R^3$ may be unsubstituted or substituted with substituents selected from $C_1$–$C_4$ alkyl.

Preferably the X comprises about 8 to 50 weight percent and most preferably about 8 to 46 weight percent of the E/X/Y copolymer and the Y can be from about 0.5 to 9 weight percent, and preferably about 1 to 4 weight percent of the E/X/Y copolymer.

The present invention also comprises a grafted copolymer having zero mole percent X corresponding to the formula E/Y-(G) as illustrated in Example 5 (grafted ethylene/ GMA). As such the present invention provides a thermally-stable, grafted copolymer E/X/Y-(G) composition comprising monomers E, X, and Y in random order and grafting reagent G, wherein:
- E is ethylene;
- X comprises from 0 to 70 weight percent relative to the total weight of E/X/Y and is selected from the group consisting of a $C_1$ to $C_8$ alkyl acrylate, a $C_1$ to $C_8$ alkyl methacrylate, and vinyl acetate;
- Y comprises about 1 to 4 weight percent relative to the total weight of E/X/Y of a glycidyl containing monomer selected from the group consisting of glycidyl acrylate, glycidyl methacrylate and glycidyl vinyl ether; and
- G comprises from 15 to 150 percent of a stoichiometric amount with respect to the weight of the glycidyl moiety, of a secondary aminosilane compound of the formula

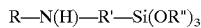

wherein R' is a $C_1$ to $C_6$ alkylene group, R" is a $C_1$ to $C_6$ alkyl group, and R is selected from
- a) a secondary radical of the formula —$CHR^1R^2$ wherein $R^1$ and $R^2$ are independently selected from $C_1$ to $C_6$ alkyl or $C_1$–$C_6$ arylalkyl and wherein $R^1$ and $R^2$ may be joined to form a $C_5$ to $C_9$ cycloaliphatic ring; or
- b) a primary radical of the formula —$CH_2R^3$ wherein $R^3$ is selected from (i) a $C_3$ to $C_{12}$ alkyl group, wherein, in the case of a $C_3$ to $C_6$ alkyl group, said alkyl moiety is branched, or (ii) a ($C_1$ to $C_{12}$ alkyl)-aryl group, wherein $R^1$, $R^2$, and $R^3$ may be unsubstituted or substituted with substituents selected from $C_1$–$C_4$ alkyl.

The grafted polymeric compounds according to the instant invention are thermally stable and have a melt index ranging from 1 to 2000. The melt index is preferably 1 to 60 for wire and cable applications and 50 to 2000 for hot melt adhesives.

The present invention also comprises thermally-stable, melt-processible, moisture-curable, graft copolymer composition which comprises the reaction products of a direct ethylene copolymer containing epoxide groups and a grafting compound, wherein said grafting compound is a secondary aminosilane compound of the formula

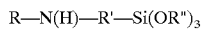

wherein R contains up to 12 carbons, R' is a $C_1$ to $C_6$ alkylene group, R" is a $C_1$ to $C_6$ alkyl group, and the direct ethylene copolymer is derived from monomers comprising:
- (a) ethylene;
- (b) 8 to 70 weight percent of $C_1$ to $C_8$ alkyl acrylate or methacrylate or vinyl acetate;
- (c) 1 to 4 weight percent of a glycidyl containing monomer selected from the group consisting of glycidyl acrylate, glycidyl methacrylate and glycidyl vinyl ether.

The present invention also relates to hot melt adhesive compositions or wire and cable compositions containing or comprising said grafted copolymer compositions and to hot melt adhesive compositions and/or wires and cables which contain the post-extrusion, post-hydrolyzed crosslinked versions of said polymer compositions.

The invention herein also relates to a method for coating a wire comprising the steps of:
- (a) extruding a mixture of a direct ethylene copolymer composition containing epoxide groups and a grafting compound around a wire, wherein said direct ethylene copolymer is derived from monomers comprising:
    - (i) ethylene;
    - (ii) 8 to 70 weight percent of $C_1$ to $C_8$ alkyl acrylate or methacrylate or vinyl acetate;
    - (iii) 1 to 4 weight percent of a glycidyl containing monomer selected from the group consisting of glycidyl acrylate, glycidyl methacrylate and glycidyl vinyl ether, and said grafting compound comprises about 15 to 150 weight percent of a stoichiometric amount with respect to the weight of the glycidyl moiety of a secondary aminosilane of the formula

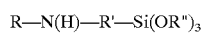

wherein R' is a $C_1$ to $C_6$ alkylene group, R" is a $C_1$ to $C_6$ alkyl group, and R is selected from
- (i) a secondary radical of the formula —$CHR^1R^2$ wherein $R^1$ and $R^2$ are independently selected from $C_1$ to $C_6$ alkyl or $C_1$–$C_6$ arylalkyl and wherein $R^1$ and $R^2$ may be joined to form a $C_5$ to $C_9$ cycloaliphatic ring; or
- (ii) a primary radical of the formula —$CH_2R^3$ wherein $R^3$ is selected from (i) a $C_3$ to $C_{12}$ alkyl group, wherein, in the case of a $C_3$ to $C_6$ alkyl group, said alkyl moiety is branched, or (ii) a ($C_1$ to $C_{12}$ alkyl)-aryl group, wherein $R^1$, $R^2$, and $R^3$ may be unsubstituted or substituted with substituents selected from $C_1$–$C_4$ alkyl; and
- (b) curing the coating on the wire by contacting the coated wire with water or air having a relative humidity of greater than 50%.

The invention also relates to method to improve the thermal stability of N-(substituted) aminopropyl trimethoxysilane grafted ethylene copolymers comprising:
- (a) selecting a direct ethylene copolymer derived from monomers comprising:
    - (i) ethylene;
    - (ii) 8 to 70 weight percent of $C_1$ to $C_8$ alkyl acrylate or methacrylate or vinyl acetate;
    - (iii) 1 to 4 weight percent of a glycidyl containing monomer selected from the group consisting of glycidyl acrylate, glycidyl methacrylate and glycidyl vinyl ether, and
- (b) contacting the copolymer of a with a grafting compound comprising about 15 to 150 weight percent of a stoichiometric amount with respect to the weight of the glycidyl moiety of a secondary aminosilane of the formula R—N(H)—CH$_2$CH$_2$CH$_2$—Si(OCH$_3$)$_3$ wherein R is selected from
(i) a secondary radical of the formula —CHR$^1$R$^2$ wherein R$^1$ and R$^2$ are independently selected from C$_1$ to C$_6$ alkyl or C$_1$–C$_6$ arylalkyl and wherein R$^1$ and R$^2$ may be joined to form a C$_5$ to C$_9$ cycloaliphatic ring; or
(ii) a primary radical of the formula —CH$_2$R$^3$ wherein R$^3$ is selected from (i) a C$_3$ to C$_{12}$ alkyl group, wherein, in the case of a C$_3$ to C$_6$ alkyl group, said alkyl moiety is branched, or (ii) a (C$_1$ to C$_{12}$ alkyl)-aryl group, wherein R$^1$, R$^2$, and R$^3$ may be unsubstituted or substituted with substituents selected from C$_1$–C$_4$ alkyl, to form a thermally-stable, N-(substituted) aminopropyl trimethoxysilane grafted ethylene copolymer.

Definitions

The term "direct copolymer" refers to a polymeric chain made from the respective monomeric units and serves as the base polymer for the "grafted copolymer" which includes a grafting reagent (or portion thereof) covalently bonded to the base polymer.

The term "glycidyl" refers to a group derived from 2,3-epoxy-1-propanyl and a glycidyl monomer is an epoxy containing monomer.

The term "thermally stable" means that the grafted copolymer of the invention does not undesirably crosslink (or decompose) at the temperatures necessary to form or use the particular grafted direct copolymer without also negatively affecting the stability of the base direct copolymer or of the grafted polymer to the extent that such polymer cannot be satisfactorily used as a hot melt adhesive or as a wire and cable composition. The temperatures referred to above may vary depending upon the non-ethylene components in the direct copolymer (for example vinyl acetate versus alkyl acrylates) and also depends upon the nature of the silane grafting reagent.

For suitability as a hot melt adhesive, the composition needs to be thermally stable in a hot melt container over an extended period of time at a temperature of, for example, 135 degrees Centigrade. The grafted polymers of this invention are thermally stable under these conditions. The vinyl acetate containing polymers are suitable as wire and cable compositions and are stable under the conditions necessary to form the compositions (in an extruder) for wire and cable applications.

DETAILED DESCRIPTION OF THE INVENTION

The compositions of the invention are high performance polymeric compositions suitable for wire and cable and hot melt adhesive use. The recited compositions do not require special equipment (i.e. CV tubes) or peroxides, extruder catalysts or high graft temperatures to achieve significant thermoset properties suitable for wire and cable compositions and for hot melt adhesive compositions.

The inventors have surprisingly found that lower levels of GMA or glycidyl moiety in the direct copolymer described herein coupled with the particular type of grafting material influences the temperature at which grafting occurs (e.g. grafting can occur at lower temperatures) and influences the variability of the grafting reaction in terms of graft level (e.g. provides more consistent-less variable-grafting levels). Grafting at lower temperatures is particularly suitable for wire and cable compositions because crosslinking side reactions are minimized.

The compositions of the invention include thermally stable hot melt adhesive compositions and wire and cable compositions. The thermally stable hot melt adhesive compositions are N-substituted aminopropyl trimethoxysilane grafted ethylene alkyl acrylate or alkyl methacrylate copolymers also having as a third comonomer a low weight percentage of an epoxy containing monomer beta to the nitrogen on the grafting agent. The wire and cable compositions are N-substituted aminopropyl trimethoxysilane grafted ethylene vinyl acetate copolymers also having as a third comonomer a low weight percentage of a epoxy containing monomer beta to the nitrogen on the grafting agent. Secondary aminosilane compounds based on triethoxysilane composition comprise the invention also.

The compositions of the invention are thermally-stable, graft copolymers which are the reaction products of a direct ethylene copolymer containing epoxide groups and a grafting compound which is a secondary aminosilane compound of the general formula R—N(H)—R'—Si(OR")$_3$ wherein R' is a C$_1$ to C$_6$ alkylene group, R" is a C$_1$ to C$_6$ alkyl group, and preferably of the formula R—N(H)—CH$_2$CH$_2$CH$_2$—Si(OCH$_3$)$_3$ wherein R is selected from a) a secondary radical of the formula —CHR$^1$R$^2$ wherein R$^1$ and R$^2$ are independently selected from C$_1$ to C$_6$ alkyl or C$_1$–C$_6$ arylalkyl and wherein R$^1$ and R$^2$ may be joined to form a C$_5$ to C$_9$ cycloaliphatic ring; or c) a primary radical of the formula —CH$_2$R$^3$ wherein R$^3$ is selected from (i) a C$_3$ to C$_{12}$ alkyl group, wherein, in the case of a C$_3$ to C$_6$ alkyl group, said alkyl moiety is branched, or (ii) a (C$_1$ to C$_{12}$ alkyl)-aryl group, wherein R$^1$, R$^2$, and R$^3$ may be unsubstituted or substituted with substituents selected from C$_1$–C$_4$ alkyl.

The Direct Ethylene Copolymer

The direct copolymer (E/X/Y) derived by copolymerization of the monomeric the units of E, X, and Y in random order has a glycidyl monomer incorporated therein as defined above as the Y component in the percentage range of 0.5 to 9 wt. percent, preferably 1 to 4 weight percent. The glycidyl monomers are the glycidyl esters of acrylic and methacrylic acid and also glycidyl vinyl ether. Glycidyl methacrylate is especially preferred.

In order to provide thermal stability to the grafted copolymers of the invention, the percentage of glycidyl monomer in the terpolymer needs to be carefully controlled and should preferably be between 0.5 and 9 weight percent, with the preferred percentage when the grafting reagent is selected from N-cyclohexylaminopropyl trimethoxy silane being approximately 4 wt. % or less for hot melt adhesive application and 2 wt. % or less for wire and cable. Surprisingly, no catalyst is required for grafting or eventual moisture cure of a thermoset composition containing the grafted copolymer.

The X component of the direct ethylene copolymer is selected from C$_1$ to C$_8$ alkyl acrylates such as n-butyl acrylate or methacrylate and is present in a wt. percentage range relative to the other components in the direct copolymer of 8 to 70 weight percent, preferably 8 to 50 weight percent, most preferably 8 to 46 weight percent. The X component may also be selected from a vinyl acetate moiety in the same weight range.

These copolymers containing the E/X/Y components in the weight percentages listed above are generally prepared by well-known methods of preparing such copolymers. These methods typically use a continuous stirred reactor at high temperatures and pressures, as described in U.S. Pat. Nos. 4,351,931 and 3,780,140. The melt index of the direct copolymers used as precursors herein may have a melt index range of 1 to 2000.

Preparation of an E/X/Y terpolymer of ethylene n-butyl acrylate glycidyl methacrylate of weight % composition 66.75/28/5.25 as may be used in this invention typically involves polymerization in a stirred autoclave reactor above 20,000 psi and at reactor temperatures above 150° C. Random monomer polymerization is initiated with peroxide free radicals. A telogen such as acetone is used to control molecular weight to the desired range. High and then low pressure separators are used to let down reactor pressure. Resin is isolated as pellets melt cut under water, dried, and packaged. The polymer described here is commercially available from DuPont as Elvaloy®AM resin, has a melt index of 12 g/10 min., crystalline melting point of 72° C., and density of 0.94 g/cm$^3$. Stress strain properties by ASTM D638 with a 2 inch/min. pull rate are 750 psi (5.2 mPa) tensile strength, 950% elongation at break, and 73 Shore A durometer hardness.

Preparation of an E/X/Y terpolymer of ethylene vinyl acetate glycidyl methacrylate of weight % composition 66.75/32/2 as may be used in this invention is carried out by polymerization in a stirred autoclave at 27,000 psi pressure, 168° C. reactor temperature, and peroxide free radical initiation. An acetone telogen is used to control molecular weight to provide resin with melt index in the range of 3–50 g/10 min. isolated after pressure let down, melt pelletization, and drying.

The direct copolymers utilized in this invention having a vinyl acetate component have a Melt Index range of between 1 and 60 g/10 min. and are suitable for wire and cable applications. The resulting grafted copolymers prepared from these direct copolymers should have a MI range that is similar to the precursor direct copolymer. No major change in MI properties should generally occur upon grafting; the MI of the grafted polymer is usually not more than 20% different than the precursor copolymer.

The Grafting Reagent

As described above, the grafting reagent is selected from an N-substituted aminoalkyl trialkoxysilane which after grafting and upon moisture cure provides good thermoset and/or controlled crosslinking for the hot melt adhesive or the wire and cable composition. Generally these reagents are commercially available or made from commercially available precursors.

The suitable aminosilanes are selected from a compound of the formula R—N(H)—R'—Si(OR")$_3$ wherein R' is a $C_1$ to $C_6$ alkylene group, R" is a $C_1$ to $C_6$ alkyl group, and R is selected from a) a secondary radical of the formula —CHR$^1$R$^2$ wherein R$^1$ and R$^2$ are independently selected from $C_1$ to $C_6$ alkyl or $C_1$–$C_6$ arylalkyl and wherein R$^1$ and R$^2$ may be joined to form a $C_5$ to $C_9$ cycloaliphatic ring; or b) a primary radical of the formula —CH$_2$R$^3$ wherein R$^3$ is selected from (i) a $C_3$ to $C_{12}$ alkyl group, wherein, in the case of a $C_3$ to $C_6$ alkyl group, said alkyl moiety is branched, or (ii) a ($C_1$ to $C_{12}$ alkyl)-aryl group, wherein R$^1$, R$^2$, and R$^3$ may be unsubstituted or substituted with substituents selected from $C_1$ to $C_4$ alkyl.

The secondary radicals are selected from, for example, isopropyl, isobutyl or cyclohexyl or $C_1$ to $C_4$ alkyl substituted versions thereof and are also selected from an arylalkyl such as benzyl, phenylethyl and the like. The primary radicals are selected from moieties such as isobutyl, —CH$_2$CH(CH$_3$)$_2$ or higher homologs such as, —CH$_2$(C$_4$H$_9$ to C$_{11}$H$_{23}$) and also include a $C_1$ to $C_{12}$ alkyl substituted arly or simiolar arlyalkyl, collectively a ($C_1$ to $C_{12}$ alkyl)-aryl group. The preferred aminosilane is R—N(H)—CH$_2$CH$_2$CH$_2$—Si(OCH$_3$)$_3$ where R is cyclohexyl.

The Resulting Grafted Ethylene Copolymer

The grafted ethylene copolymer of the invention herein results from the reaction product(s) of the direct copolymer and the grafting reagent described above. The glycidyl group reacts with the secondary amine (amino) group of the aminosilane. The stoichiometric amount of the secondary amino silane relative to the glycidyl moiety can vary considerably from 15 to 150 percent, based on weight. The skilled artisan can vary this according to the degree of crosslinking desired in the post-extruded, post-hydrolyzed product. The resulting crosslinking leads to high heat resistance, oil resistance, mechanical strength, good abrasion as well as cut resistance etc.

In general, the grafting reaction occurs by contacting the direct copolymer and the aminosilane in, e.g., a high shear melt mixer such as an extruder equipped with a suitable mixing screw or other high shear mixers such as a Banbury, Brabender or Haake mixer, though any suitable mixer is contemplated. Melt temperatures above 110° C. are used to allow sufficiently rapid reaction without increasing the possibility of undesirable side reactions. Stearic acid and triphenylphosphine may be further or additionally added to the reaction system to catalyze the reaction although, as indicated above, they are not required or necessary.

Generally, reaction temperatures above 220° C. are not suitable when vinyl acetate is in the polymer because of potential polymer degradation. No solvent is generally used and hold up times required for complete reaction are typically about 1 to 10 minutes depending upon the temperature, shear and/or catalyst system if present. While close to stoichiometric amounts of aminosilane and glycidyl moiety are most suitable, an aminosilane/glycidyl ratio of from 0.15/1 to 1.5/1 can be used. The process of preparation is that as described in the examples. In contrast to the use of t-butyl derivatives as described in the prior art, high temperatures were not required to graft the aminosilane.

For wire and cable applications, the aminosilane is typically grafted to glycidyl methacrylate epoxy-containing polymers, such as ethylene vinyl acetate and ethylene n-butyl acrylate, by heating at 110 to 200° C. in a high shear mixer such as a Banbury, Brabender, Haake, Buss co-kneader, or in a single or twin screw extruder for about 1 to 10 minutes, depending on the temperature. Grafting also takes place by compression or injection molding plaques containing the mixed compound of glycidyl methacrylate polymer and aminosilane. The reaction of N-cyclohexylaminopropyl trimethoxysilane with epoxy group of the glycidyl methacrylate moiety is rapid and complete at 150° C. and even occurs at 110° C. at reasonable rate.

In the absence of moisture, crosslinking does not take place and the grafted compound is re-shapeable. If sufficient moisture is present in the grafted compound, as may be introduced with a filler, scorch or pre-cure may occur and result in increased compound viscosity and difficulty in subsequent processing, such as extrusion on to wire. Use of dry fillers or pre-drying of compound ingredients minimizes potential scorch.

The grafted copolymers of the invention are suitable for use alone or in combination with other ingredients depending upon the final use/product. For example, they can be formulated with tackifiers or plasticizers or other excipients used in hot melt adhesives or in wire and cable compositions. These grafted copolymers may be used in neat form or blended with the stated excipients for either hot melt use or for wire and cable use. The grafted copolymers of the invention may further be processed and reshaped into the final configuration between 110° C. and 170° C. as long as moisture is avoided.

For hot melt adhesive use, the neat grafted copolymer can be utilized as a hot melt adhesive or it can be formulated. There are many possible formulations, but a typical formulation might contain about one third polymer, one third of a hydrocarbon wax (paraffin or microcrystalline), one third of a tackifier resin and ppm level of an antioxidant package (e.g. phenolic and phosphite). Sometimes only polymer, tackifying resin and antioxidant are included in the formulation. Tackifier resins commonly used are $C_5$ and $C_9$ hydrocarbon resins and rosin esters. Hot melt adhesives are normally produced in high shear batch mixers such as sigma blades, Banburys, Brabenders, Haake, etc. There are many uses for moisture-curable adhesives, including automotive gaskets, auto interior trim, auto head and tail lamps, furniture assembly including edge banding, bookbinding and general product assembly.

For wire and cable applications, the grafted copolymer is prepared by addition of aminosilane to the mixed compound in the wire coating extruder. Residence times of typically 3 to 5 minutes at temperatures of 150° C. provide good conditions for grafting secondary aminosilanes inside the extruder during coating of the wire. No catalysts are needed for the grafting reaction. The coated wire is wound on a reel which then may be submerged in 75 to 80° C. water for 8 to 24 hours to bring about moisture cure. Prior to cure some care in handling is required to avoid deformation. The water permeates through the coating to react with the trimethoxysilane groups on two separate polymers to form a Si—O—Si crosslink bond with elimination of methanol.

For medium and high voltage power cable, an ethylene vinyl acetate- or n-butyl acrylate-glycidyl methacrylate semicon compound is extruded onto wire with grafting of aminosilane introduced in the wire line extruder. By the same procedure, an insulation compound of ethylene glycidyl methacrylate or other moisture curable polyethylene insulation is extruded with a second extruder over the semicon again with aminosilane introduced. And finally in a third extruder, a second outer semicon of ethylene vinyl acetate-glycidyl methacrylate and aminosilane is extruded and grafted in the extruder while wire coating. These three layers, all of which contain grafted aminosilane can then be simultaneously cured by submersion in warm water. This moisture cure technology is especially effective in power cables where semicon compounds contain relatively low filler levels and the PE insulation is unfilled so moisture crosslinking during grafting is minimal because of low moisture content in the compounds.

The same glycidyl epoxy/aminosilane technology provides moisture curable flame retardant non-halogen jackets and automotive primary wire. These compounds differ from power cable semicons in containing higher levels of mineral fillers so that greater care must be taken to assure dry compound ingredients to minimize pre-cure during grafting of the aminosilane. Any wire and cable compound (i.e., for use as semicon, insulation, and/or jacket) containing an epoxy group according to the instant invention can be grafted with an appropriate aminosilane under extruder conditions during wire line coating and subsequently be moisture cured with water to provide cables with attractive physical properties.

The resulting graft copolymers of this invention have a melt index (MI) of from 1 to 2,000. Higher melt index polymers are particularly suitable for hot melt adhesive use while the lower melt index polymers (e.g., vinyl acetate containing polymers) are suitable for wire and cable applications.

Moisture curing occurs by crosslinking of the direct polymer through the silane groups. Crosslinking during moisture cure causes increased strength and modulus. The crosslinking reaction on moisture treatment of the grafted copolymer can occur at room temperature and at 50% humidity or higher, but is accelerated at higher temperatures and higher relative humidity. Total immersion in warm water provides commercially attractive cure rates for coated wire.

Test Procedures

In the examples which follow, the preparation of the moisture curable ethylene graft copolymer is described. The rate of moisture cure is monitored by viscosity change and the thermal stability of the graft copolymers is determined.

Melt Index (MI) is determined using ASTM D-1238 (2160 g. load/190 deg. C. with values in units of g/10 min.).

Viscosity stability for adhesives was measured using a Brookfield viscometer at 135° C. and a shear rate of 0.1 sec−1. The polymer is kept at this temperature in an open cup, and viscosity change continuously monitored. This temperature is a typical melt processing temperature for adhesives. For adhesives, long hold up times in the melt are desired. In the test, a viscosity increase of less than 50% over a period of eight hours is considered an indication of thermal stability and sufficient for adhesive use. Such a test is also indicative of stability at higher temperatures with shorter hold up times such as in an extrusion process where exposure to high temperature is generally in or over a several minute period.

The curability or ease at which the polymer crosslinks with moisture was determined in the following way. A 70 mil compression molded plaque was prepared using a press temperature of 120° C. and a 5,000 pound load. The plaque was placed in a humidity chamber kept at 70° C. and 95% relative humidity. After 24 hours, melt index tests are carried out. Low or no flow after this time indicates a good cure rate.

Viscosity stability for wire and cable was measured on the compound using a Mooney viscometer after 1+4 minutes at 100° C. with the large rotor by ASTM D1646. Compounds were stored at 23° C. in 50% relative humidity and Mooney viscosity (ML) increase measured over time.

Curability for wire and cable was determined by measurement of tensile properties by ASTM D412 of molded test plaques or coated wire. Volume resistivity, an important property for power cable semicons, was measured by ASTM D991. Volume resistivity for insulation material was measured by ASTM D257. Dielectric strength was measured by ASTM D149 in oil by increasing voltage at a rate of 500 volt/sec. Dielectric constant and dissipation factor were measured by ASTM D150.

For wire and cable samples, grafting of aminosilane was carried out either in compression molded 2 mm plaques heated 5 minutes at 150 or 180 (or 177)° C. or in a wire line extruder at 60–150° C. during wire coating. Moisture crosslinking through the silane groups of the grafted aminosilane was carried out by submersion of test plaques and coated wire in water at 80° C. for 24 hours.

EXAMPLES

The following example demonstrates that a lower glycidyl moiety percentage in an ethylene/alkyl acrylate terpolymer grafted with a substituted N-aminoalkyl trialkoxysilane has the physical properties which are indicative of a hot melt adhesive.

Example 1

Grafted Ethylene/n-Butyl Acrylate/GMA in Hot Melt Adhesive 45 g. of an ethylene/n-butylacrylate/glycidyl methacrylate containing 4 wt. % GMA and 30 weight percent nBA and having a melt index of 1000 was reacted with 3.3 g. of N-cyclohexylaminopropyl trimethoxysilane in a Brabender mixer at 160° C. for 10 min. Rotor speed was 100 rpm. This represents a stoichiometric balance of aminosilane to the glycidyl moiety. The MI of the grafted product was 1098. This is above that of the direct copolymer which suggests that little or no crosslinking occurred during the preparation of the grafted copolymer.

Thermal stability of the product was determined. The Brookfield viscosity initially was 33,600 centipoise. Viscosity increased approximately 40% in 8 hours indicating adequate thermal stability for hot melt adhesive use. Cure tests showed the resin to have no flow after the 24 hour moisture treatment at 70° C. indicating the efficiency of the crosslinking by moisture. No catalyst was required for moisture cure or for preparation of the grafted product.

Comparative Example 1

45 g. of an ethylene/n-butyl acrylate/glycidyl methacrylate direct copolymer containing 25 wt. % n-butyl acrylate and 7.6 wt. % glycidyl methacrylate and having an MI of 900 was reacted with 8.14 g. of N-cyclohexylaminopropyl trimethoxysilane using a 30% molar excess of silane. Melt index of the grafted product was 1443. Cure was excellent, the resin exhibiting no flow after 24 hours under the conditions described above. Thermal stability was unacceptable or poor-viscosity increased from 22,000 by 100% in only 210 minutes.

The above example demonstrates that the relative percentage of glycidyl methacrylate in the terpolymer makes a significant difference in the ultimate thermal stability of the grafted product formed therefrom. These examples also demonstrate that the ability to moisture cure is not negatively impacted by lowering the percentage of glycidyl groups and thus lowering the percentage of grafted sites or moisture cure crosslinking sites.

Example 2

Grafted Ethylene/n-Butyl Acrylate/GMA in Wire and Cable Semicon

A semicon compound based on ethylene n-butyl acrylate glycidyl methacrylate (GMA) with 28 wt. % n-butyl acrylate and 5.25 wt. % GMA with 12 melt index (commercially DuPont Elvaloy®AM resin) was mixed in a lab-size banbury internal mixer with Black Pearls 3200, high purity fine particle size conductive furnace black from Cabot Corp., stearic acid, and Irganox 1010 hindered phenol antioxidant from Ciba-Geigy. The compound ingredients were mixed to 121° C., held 2 minutes, dropped, sheeted, and allowed to cool. The compound formulation in parts per hundred rubber (phr) is listed in Table 1. Stearic acid is a process aid but also has a catalytic effect on the grafting reaction. A stoichiometric amount of N-cyclohexylaminopropyl trimethoxysilane and 38% of the stoichiometric amount (Samples 1 and 2, respectively) were added to the compound on a 90° C. two-roll mill along with a small amount of the carbon black which was held out of the banbury mix. The cyclohexylaminosilane was obtained from Huls America Inc. as PSX5411. The mixed stock was sheeted off the same day for Mooney viscosity and preparation of test plaques.

Mooney viscosity biscuits were stored at 23° C. in a 50% relative humidity test lab and ML-1+4 at 100° C. periodically measured. Test plaques with 2 mm thickness were molded the same day of the mix for 5 minutes in a heated press at either 150° C. (Condition A) or 180° C. (Condition B) to graft the aminosilane to the GMA epoxy on the polymer. Test plaques were moisture cured by submersion for 24 hours in an 80° C. water bath. Mooney viscosity, original and heat aged tensiles, and volume resistivity results are found in Table 1. Volume resistivity provides an important measure of the electrical suitability of the semicon for the application.

The increase in stock viscosity measured by Mooney shows that moisture cure occurs slowly at ambient temperature in 50% relative humidity. All compounds are tightly cured as shown by the high tensile strength and low elongation values. The grafting reaction occurs at 150° C. as well as it does at 180° C. A more optimum cure with higher elongation is possible with a resin with reduced glycidyl methacrylate than the 5.25 wt. % present in Elvaloy®AM. Volume resistivity results are well within the requirements for electrically conductive semicons.

TABLE 1

Moisture Cured Semicon of Ethylene n-Butyl Acrylate Glycidyl Methacrylate with Stoichiometric And Less Than Stoichiometric N-Cychohexylaminopropyl Trimethoxysilane

| | phr | |
|---|---|---|
| Compound | 1 | 2 |
| Elvaloy ® AM | 100 | 100 |
| Black Pearls 3200 | 75 | 75 |
| Stearic Acid | 1 | 1 |
| Irganox 1010 | 1.5 | 1.5 |
| PSX 5411 Aminosilane | 10.14 | 3.87 |

Test Plaques-2 mm
Graft Conditions:

A-5 min. at 150° C. in press
B-5 min. at 180° C. in press
Moisture Cure Conditions: 24 Hours in 80° C. water bath
Results:

| | Compound | |
|---|---|---|
| ML-1 + 4 at 100° C. | 1 | 2 |
| 1 Day after mix | 41 | 63 |
| 2 Days after mix | 58 | 78 |
| 8 Days after mix | Off scale | Off scale |

| | Compound 1 | | Compound 2 | |
|---|---|---|---|---|
| | A | B | A | B |
| Stress/Strain Original | | | | |
| Hardness, Shore A | 87 | 91 | 91 | 89 |
| $T_B$, mPa | 18.2 | 20.1 | 15.0 | 15.1 |
| $E_B$, % | 56 | 58 | 83 | 84 |
| Heat Aged 7 Days @ 150° C. | | | | |
| Hardness, Pts. Chg. | 0 | −12 | −8 | −4 |
| $T_B$, % Retention | 96 | 95 | 127 | 132 |
| $E_B$, % Retention | 66 | 71 | 65 | 75 |
| Volume Resistivity, | | | | |
| ohm · meter | 7 | 8 | 211 | 8 |

Example 3

Grafted Ethylene/Vinyl Acetate/GMA in Wire and Cable Semicon

A semicon compound based on ethylene vinyl acetate glycidyl methacrylate (GMA) with 32 wt. % vinyl acetate and 2.0 wt. % GMA with 26 melt index was mixed with the same ingredients, again in a lab-size banbury mixer in the same manner as in Example 2. A stoichiometric amount of N-cyclohexylaminopropyl trimethoxysilane was added to the compound listed in Table 2 on a 90° C. two-roll mill as before. The mixed stock was again sheeted off the same day for Mooney viscosity and preparation of test plaques. Results are found in Table 2.

Curing takes place slowly at 23° C. in 50% relative humidity as shown by the Mooney viscosity increase while curing is rapid in 80° C. water as shown by the tensile results. Again, the grafting reaction was equally facile at 150 as at 180° C. The 2% GMA level in this polymer provides a more optimum cure state level as indicated by the original elongation values of well over 100%.

TABLE 2

Moisture Cured Semicon of Ethylene Vinyl Acetate
Glycidyl Methacrylate with N-Cychohexylaminopropyl Trimethoxysilane

| Compound | phr 3 | |
|---|---|---|
| EVA GMA | 100 | |
| Black Pearls 3200 | 75 | |
| Stearic Acid | 1 | |
| Irganox 1010 | 1.5 | |
| PSX 5411 Aminosilane | 3.87 | |
| Test Plaques-2 mm Graft Conditions: | | |
| A-5 min. at 150° C. in press | | |
| B-5 min. at 180° C. in press | | |
| Moisture Cure Conditions: 24 Hours in 80° C. water bath | | |
| Results: | | |
| ML-1 + 4 at 100° C. | | |
| 1 Day after mix | 56 | |
| 2 Days after mix | 60 | |
| 8 Days after mix | 74 | |
| 15 Days after mix | Off scale | |
|  | A | B |
| Stress/Strain Original |  |  |
| Hardness, Shore A | 83 | 92 |
| M100, mPa | 13.0 | 13.2 |
| $T_B$, mPa | 13.1 | 13.4 |
| $E_B$, % | 153 | 145 |
| Heat Aged 7 Days @ 150° C. |  |  |
| Hardness, Pts. Chg. | +4 | 0 |
| M100, % Retention | 134 | 131 |
| $T_B$, % Retention | 140 | 137 |
| $E_B$, % Retention | 83 | 88 |
| Volume Resistivity, |  |  |
| ohm · meter | 3.3 | 1.3 |

Example 4

Grafted Ethylene/Vinyl Acetate/GMA Semicon Extruded on Wire

A semicon compound based on ethylene vinyl acetate glycidyl methacrylate (GMA) with 32 wt. % vinyl acetate and 2.0 wt. % GMA with 27 melt index was mixed with the same ingredients in a lab-size banbury internal mixer in the same manner as in Examples 2 & 3. A stoichiometric amount of N-cyclohexylaminopropyl trimethoxysilane was added to the compound listed in Table 3 on a 90° C. two-roll mill as before. But here the mixed stock was extruded on to wire the same day of the mix. A Royal L/D=15/1, 1¼ inch rubber extruder with a low compression general transition screw with crosshead for wire coating was used. The extruder temperature profile was 60 to 150° C. A breaker plate and 60 mesh screen pack were employed. An approximate 1 mm thickness of compound with smooth surface was coated on the 12 gauge solid aluminum conductor with an extruder rpm of 13 and line speed of 7 m/min. Grafting of the aminosilane to the GMA epoxy takes place in the extruder during wire coating. The estimated compound melt temperature was at least 125° C. Moisture cure in the extruder appeared minimal as indicated by the unchanged head pressure during this short extrusion run.

Curing takes place slowly at 23° C. in 50% relative humidity as shown by the increase in modulus and tensile strength and decrease in elongation of coated uncured wire stored in our physical test lab and periodically tested over time (Table 3). Curing is rapid in 80° C. water as shown by the tensile results. The 2% GMA level in this polymer and stoichiometric amount of aminosilane provide an optimum cure state level.

TABLE 3

Moisture Cured Semicon of Ethylene Vinyl Acetate
Glycidyl Methacrylate with n-Cyclohexylaminopropyl
Trimethoxysilane Extruded on Wire

| Compound | Phr 4 | | |
|---|---|---|---|
| EVA GMA | 100 | | |
| Black Pearls 3200 | 75 | | |
| Stearic Acid | 1 | | |
| Irganox 1010 | 1.5 | | |
| PSX 5411 Aminosilane | 3.87 | | |
| Wire coating-1 mm Graft Conditions: | | | |
| Extrusion on wire-extruder profile 60–150° C. | | | |
| Moisture Cure Conditions: 24 Hours in 80° C. water bath | | | |
| Results: | | | |
|  | Days after Mix | | |
|  | 2 | 8 | 15 |
| Uncured Wire (23° C., 50% rel. hum.) |  |  |  |
| Stress/Strain |  |  |  |
| M 100, mPa | 8.4 | 9.4 | 10.2 |
| $T_B$, mPa | 9.3 | 10.1 | 11.1 |
| $E_B$, % | 293 | 267 | 231 |
| Cured Wire (80° C. water for 24 hrs) |  |  |  |
| Stress/Strain (Original) |  |  |  |
| M 100, mPa |  | 12.7 |  |
| $T_B$, % |  | 13.6 |  |
| $E_B$, % |  | 184 |  |
| Stress/Strain (Heat Aged 7 Days @ 150° C.) |  |  |  |
| M 100, % Retention |  | 159 |  |
| $T_B$, % Retention |  | 151 |  |
| $E_B$, % Retention |  | 57 |  |

Example 5

Grafted Ethylene/GMA in Wire and Cable Insulation

Unfilled low density polyethylene is used for low and medium voltage power cable. An insulation compound based on a copolymer of ethylene and 1.8 wt. % glycidyl methacrylate with 5 melt index was mixed with a stoichiometric amount of N-cyclohexylaminopropyl trimethoxysilane in a lab-size brabender at 50 rpm and 110° C. for 5 minutes after the resin pellets were melted. Some grafting of aminosilane to GMA undoubtedly took place in the brabender as the temperature rose to 132° C. Grafting was completed by molding 2 mm test plaques in a 177° C. press for 5 minutes. Test plaques were moisture cured by submersion for 24 hours in an 80° C. water bath as previously taught. Results are found in Table 4.

An adequate moisture cure is obtained for an insulation material as indicated by the original tensile results. Electrical properties, although not quite as good as for peroxide-cured medium voltage insulation, nonetheless, are attractive.

TABLE 4

Moisture Cured Insulation of Ethylene Glycidyl Methacrylate with N-Cyclohexylaminopropyl Trimethoxysilane

| Compound | Phr 5 |
|---|---|
| EGMA | 100 |
| PSX 5411 Aminosilane | 3.48 |

Test Plaques-2 mm
Graft Conditions:

5 min. at 177° C. in press
(Some grafting likely during brabender mix)
Moisture Cure Conditions:

24 hours in 80° C. water bath
Results:

Stress/Strain (Original)

| Hardness, Shore A | 93 |
|---|---|
| M 100, mPa | 9.2 |
| $T_B$, mPa | 11.7 |
| $E_B$, % | 432 |
| Electricals | |
| Volume Resistivity, ohm · cm × $10^{16}$ | 7.6 |
| Dielectric Strength (oil) kvolt/mm | 27.2 |
| (volt/mil) | 691 |
| Dielectric Constant at 1 mHz | 2.39 |
| Dissipation Factor at 1 mHz | 0.00254 |

We claim:

1. A thermally-stable, grafted copolymer E/X/Y-(G) composition comprising monomers E, X, and Y in random order and grafting reagent G, wherein:

E is ethylene;

X comprises from 8 to 70 weight percent relative to the total weight of E/X/Y and is selected from the group consisting of a $C_1$ to $C_8$ alkyl acrylate, a $C_1$ to $C_8$ alkyl methacrylate, and vinyl acetate;

Y comprises about 1 to 4 weight percent relative to the total weight of E/X/Y of a glycidyl containing monomer selected from the group consisting of glycidyl acrylate, glycidyl methacrylate and glycidyl vinyl ether; and G comprises from 15 to 150 percent of a stoichiometric amount with respect to the weight of the glycidyl moiety, of a secondary aminosilane compound of the formula

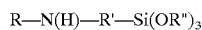

wherein R' is a $C_1$ to $C_6$ alkylene group, R" is a $C_1$ to $C_6$ alkyl group, and R is selected from a) a secondary radical of the formula —CHR$^1$R$^2$ wherein R$^1$ and R$^2$ are independently selected from $C_1$ to $C_6$ alkyl or $C_1$–$C_6$ arylalkyl and wherein R$^1$ and R$^2$ may be joined to form a $C_5$ to $C_9$ cycloaliphatic ring; or b) a primary radical of the formula —CH$_2$R$^3$ wherein R$^3$ is selected from (i) a $C_3$ to $C_{12}$ alkyl group, wherein, in the case of a $C_3$ to $C_6$ alkyl group, said alkyl moiety is branched, or (ii) a ($C_1$ to $C_{12}$ alkyl)-aryl group, wherein R$^1$, R$^2$, and R$^3$ may be unsubstituted or substituted with substituents selected from $C_1$ to $C_4$ alkyl.

2. A thermally-stable, melt-processable, moisture-curable, graft copolymer composition which comprises the reaction products of a direct ethylene copolymer containing epoxide groups and a grafting compound, wherein said grafting compound is a secondary aminosilane compound of the formula

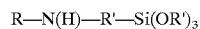

wherein R contains up to 12 carbons, R' is a $C_1$ to $C_6$ alkylene group, R" is a $C_1$ to $C_6$ alkyl group, and the direct ethylene copolymer is derived from monomers comprising:

(a) ethylene;

(b) 8 to 70 weight percent of $C_1$ to $C_8$ alkyl acrylate or methacrylate or vinyl acetate;

(a) 1 to 4 weight percent of a glycidyl containing monomer selected from the group consisting of glycidyl acrylate, glycidyl methacrylate and glycidyl vinyl ether.

3. A method for coating a wire comprising the steps of:

(a) extruding a mixture of a direct ethylene copolymer composition containing epoxide groups and a grafting compound around a wire, wherein said direct ethylene copolymer is derived from monomers comprising:

(i) ethylene;

(ii) 8 to 70 weight percent of $C_1$ to $C_8$ alkyl acrylate or methacrylate or vinyl acetate;

(i) 1 to 4 weight percent of a glycidyl containing monomer selected from the group consisting of glycidyl acrylate, glycidyl methacrylate and glycidyl vinyl ether, and said grafting compound comprises about 15 to 150 weight percent of a stoichiometric amount with respect to the weight of the glycidyl moiety of a secondary aminosilane of the formula

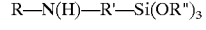

wherein R' is a $C_1$ to $C_6$ alkylene group, R" is a $C_1$ to $C_6$ alkyl group, and R is selected from (i) a secondary radical of the formula —CHR$^1$R$^2$ wherein R$^1$ and R$^2$ are independently selected from $C_1$ to $C_6$ alkyl or $C_1$ to $C_6$ arylalkyl and wherein R$^1$ and R$^2$ may be joined to form a $C_5$ to $C_9$ cycloaliphatic ring; or (ii) a primary radical of the formula —CH$_2$R$^3$ wherein R$^3$ is selected from (i) a $C_3$ to $C_{12}$ alkyl group, wherein, in the case of a $C_3$ to $C_6$ alkyl group, said alkyl moiety is branched, or (ii) a ($C_1$ to $C_{12}$ alkyl)-aryl group, wherein R$^1$, R$^2$, and R$^3$ may be unsubstituted or substituted with substituents selected from $C_1$ to $C_4$ alkyl; and (b) curing the coating on the wire by contacting the coated wire with water or air having a relative humidity of greater than 50%.

4. A method to improve the thermal stability of N-(substituted) aminopropyl trimethoxysilane grafted ethylene copolymers comprising:
  (a) selecting a direct ethylene copolymer derived from monomers comprising:
    (i) ethylene;
    (ii) 8 to 70 weight percent of $C_1$ to $C_8$ alkyl acrylate or methacrylate or vinyl acetate;
    (iii) 1 to 4 weight percent of a glycidyl containing monomer selected from the group consisting of glycidyl acrylate, glycidyl methacrylate and glycidyl vinyl ether, and
  (b) contacting the copolymer of a with a grafting compound comprising about 15 to 150 weight percent of a stoichiometric amount with respect to the weight of the glycidyl moiety of a secondary aminosilane of the formula

wherein R is selected from
    (i) a secondary radical of the formula —$CHR^1R^2$ wherein $R^1$ and $R^2$ are independently selected from $C_1$ to $C_6$ alkyl or $C_1$–$C_6$ arylalkyl and wherein $R^1$ and $R^2$ may be joined to form a $C_5$ to $C_9$ cycloaliphatic ring; or
    (ii) a primary radical of the formula —$CH_2R^3$ wherein $R^3$ is selected from (i) a $C_3$ to $C_{12}$ alkyl group, wherein, in the case of a $C_3$ to $C_6$ alkyl group, said alkyl moiety is branched, or (ii) a ($C_1$ to $C_{12}$ alkyl)-aryl group, wherein $R^1$, $R^2$, and $R^3$ may be unsubstituted or substituted with substituents selected from $C_1$ to $C_4$ alkyl,
  to form a thermally-stable, N-(substituted) aminopropyl trimethoxysilane grafted ethylene copolymer.

5. A thermally-stable, grafted copolymer E/X/Y-(G) composition comprising monomers E, X, and Y in random order and grafting reagent G, wherein:
  E is ethylene;
  X comprises from 0 to 70 weight percent relative to the total weight of E/X/Y and is selected from the group consisting of a $C_1$ to $C_8$ alkyl acrylate, a $C_1$ to $C_8$ alkyl methacrylate, and vinyl acetate;
  Y comprises about 1 to 4 weight percent relative to the total weight of E/X/Y of a glycidyl containing monomer selected from the group consisting of glycidyl acrylate, glycidyl methacrylate and glycidyl vinyl ether; and
  G comprises from 15 to 150 percent of a stoichiometric amount with respect to the weight of the glycidyl moiety, of a secondary aminosilane compound of the formula

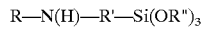

wherein R' is a $C_1$ to $C_6$ alkylene group, R" is a $C_1$ to $C_6$ alkyl group, and R is selected from
    a) a secondary radical of the formula —$CHR^1R^2$ wherein $R^1$ and $R^2$ are independently selected from $C_1$ to $C_6$ alkyl or $C_1$–$C_6$ arylalkyl and wherein $R^1$ and $R^2$ may be joined to form a $C_5$ to $C_9$ cycloaliphatic ring; or
    (b) a primary radical of the formula —$CH_2R^3$ wherein $R^3$ is selected from (i) a $C_3$ to $C_{12}$ alkyl group, wherein, in the case of a $C_3$ to $C_6$ alkyl group, said alkyl moiety is branched, or (ii) a ($C_1$ to $C_{12}$ alkyl)-aryl group, wherein $R^1$, $R^2$, and $R^3$ may be unsubstituted or substituted with substituents selected from $C_1$ to $C_4$ alkyl.

* * * * *

UNITED STATES PATENT AND TRADEMARK OFFICE
CERTIFICATE OF CORRECTION

PATENT NO. : 6,716,920 B2 Page 1 of 1
APPLICATION NO. : 10/232981
DATED : April 6, 2004
INVENTOR(S) : Arhart Richard James and Prejean George Wyatt It is certified that error appears in the above-identified patent and that said Letters Patent is hereby corrected as shown below:

Claim 2, column 16, line 18-19, delete "(OR')$_3$", add --(OR")$_3$--
Claim 3, column 16, line 40, delete "i", add --iii--
Claim 4 (b), column 17, line 13, delete "of a"

Signed and Sealed this

Fifth Day of February, 2008

JON W. DUDAS
*Director of the United States Patent and Trademark Office*